UNITED STATES PATENT OFFICE.

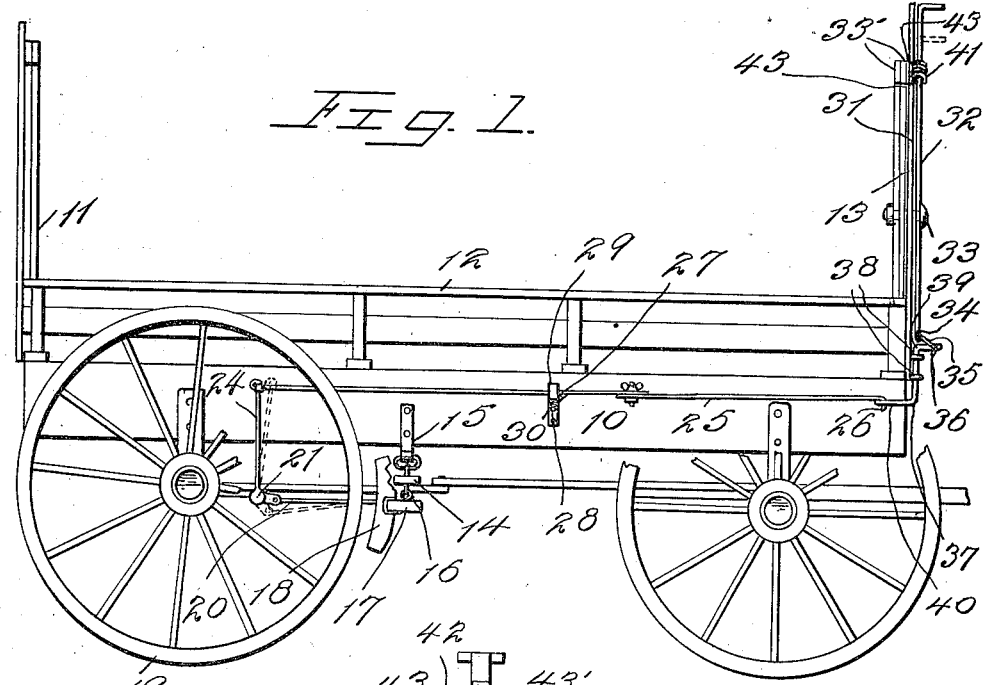
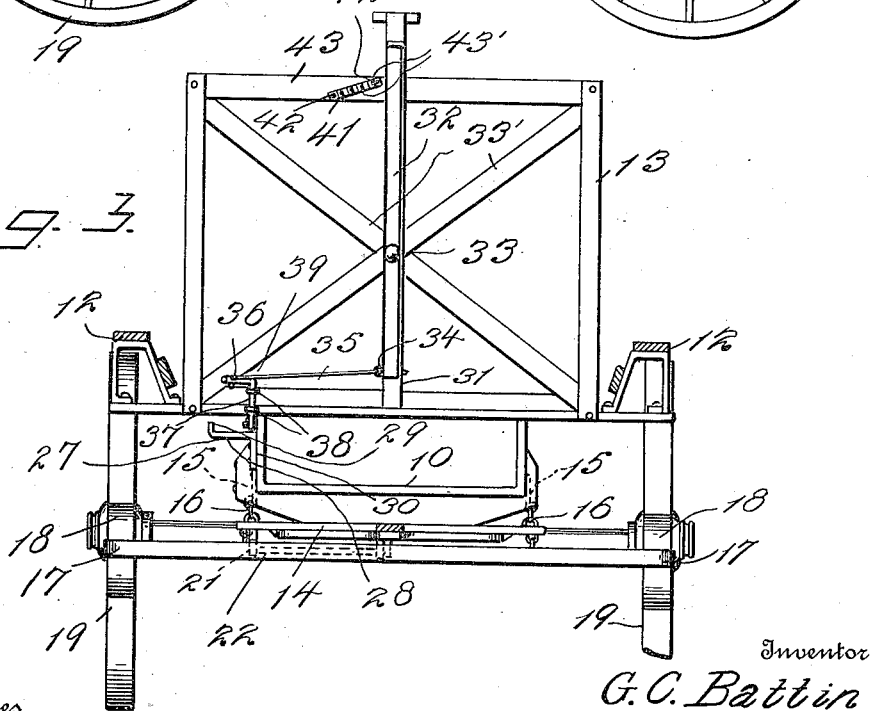

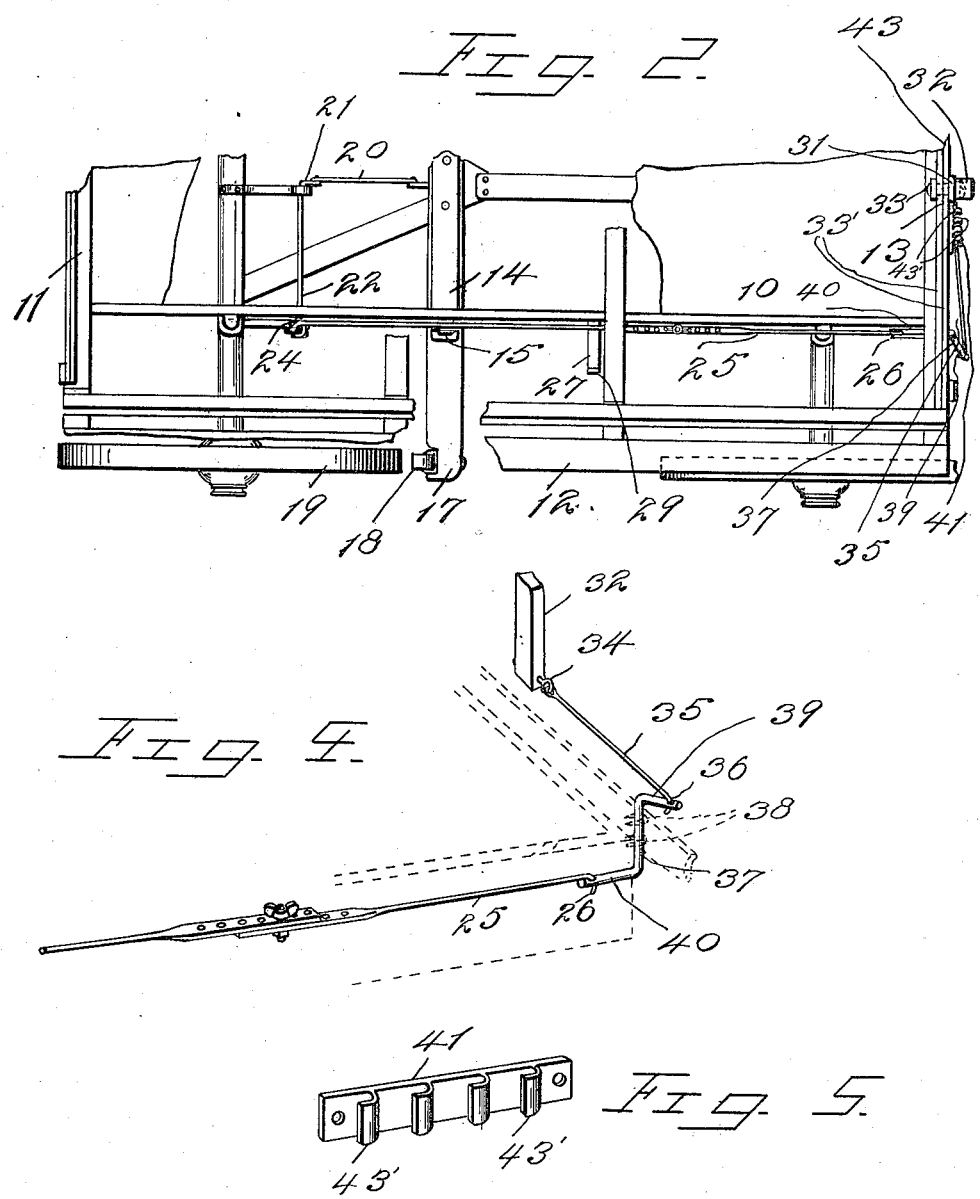

GROVER C. BATTIN, OF ALMA, NEBRASKA.

HAY-RACK BRAKE.

1,008,520.          Specification of Letters Patent.      Patented Nov. 14, 1911.

Application filed August 15, 1910. Serial No. 577,191.

*To all whom it may concern:*

Be it known that I, GROVER C. BATTIN, a citizen of the United States, residing at Alma, in the county of Harlan, State of Nebraska, have invented certain new and useful Improvements in Hay-Rack Brakes; and I do hereby declare the following to be a full, clear, and exact description of the invention, such as will enable others skilled in the art to which it appertains to make and use the same.

This invention relates to hay rack brakes and has for its object to provide brake operating means that will be mounted on the front upright of the hay rack so as to be within convenient reach of the driver.

A further object is to provide brake operating means that may be applied to many of the hay racks now in general use and without alterations to the hay rack.

Hitherto it has been generally the custom to mount the brake operating means upon the rear of the rack and to carry a lanyard from this means over the hay to the forward end of the rack, the driver pulling this lanyard when he wished to set the brakes. However, this method of applying the brake is undesirable for the reason that the vibration of the rack works the lanyard out of reach of the driver. The present invention obviates this difficulty by pivotally mounting the operating lever that applies the brakes upon the front upright of the rack, or as it is commonly called, the ladder of the rack so as to always be within convenient reach of the driver.

In the accompanying drawing forming part of this specification: Figure 1 is a side elevation of a hay rack equipped with my improved brake. Fig. 2 is a plan view of the device with portions broken away. Fig. 3 is a front end elevation of the rack showing the operating lever in released position. Fig. 4 is a detail perspective view of the brake operating means. Fig. 5 is a detail perspective view of the catch.

Referring now to the drawing, the numeral 10 designates the body, 11 the rear upright, 12 the side frames, and 13 the front upright or ladder of an ordinary hay rack. The brake mechanism comprises a hound bar 14 supported upon the leading ends of the rear hounds and being equipped at its opposite ends with box hangers 15 that are bolted or otherwise secured to the body of the rack and is further equipped at its opposite ends with interlocking eyes 16 which pivotally suspend a brake bar 17, the latter being equipped with the usual brake blocks 18 for engagement with the supporting wheels 19. A draw rod 20 connects the brake bar with a crank 21 carried by a roller 22 which is secured to the rear axle of the hay rack and is equipped at one of its outer ends with a lever 24. The above parts are of the ordinary kind and form no part of the present invention, which rather resides in the means for actuating the lever 24 so as to set the brake blocks against the wheels.

The brake actuating means comprises a brake rod 25 pivotally secured at its rear end to the lever 24 and terminating at its forward ends in a hooked extremity 26. The brake rod is supported for sliding movement upon a hanger 27, this hanger consisting of a strap shank 28 which projects horizontally from the body of the rack and is equipped at its outer end with an upturned tongue 29 which prevents accidental displacement of the brake rod and is equipped at its inner end with a downward tongue 30. The shank of the hanger is considerably elongated so as to permit the brake rod sliding laterally as well as longitudinally on the hanger.

Mounted upon the medial vertical bar 31 of the ladder is an operating lever 32, this lever being secured by a pivot bolt 33 passed transversely through the vertical bar, and intersecting portions of the diagonal braces 33' of the ladder. The lower end of the operating lever is equipped with an eye bolt 34, this eye bolt receiving the terminal eye of a link 35, this link terminating at its free end in a hooked extremity 36. Swiveled upon the body is a bell crank lever 37, staples or similar devices 38 being disposed to straddle the bridge of this bell crank lever and being driven into the body to permit of a swiveling movement of the bell crank lever. The hooked extermity of the link 35 is inserted through a suitable opening in the uppermost leg 39 of the bell crank lever, this leg projecting forwardly and inclining obliquely to the leading end of the body. The lowermost leg 40 of the bell crank lever is disposed to extend along the side of the body when in released position and is movable outwardly from the side when the lever is actuated. The hooked extremity of the brake rod 25 is engaged through a suitable opening formed in this leg. It will be seen by referring to Fig. 2 that when the operating lever is moved to operative position the uppermost leg of the bell crank lever will be rocked toward the body and the lowermost leg will be rocked from the body, thus causing the brake rod to be drawn forwardly and through the instrumentality of the lever 24 set the brake blocks in engagement with the wheels.

For locking the operating lever in any particular position, a catch 41 is provided, this catch consisting of a flat plate of metal having suitable openings adjacent its extremities for the reception of screws or similar fasteners 42, by means of which the catch is fixed to the upper horizontal bar 43 of the ladder. Arranged upon the outer face of the catch is a plurality of curved tongues 43′, these tongues being adapted to receive and lock the lever when moved to operative position as will be readily understood.

What is claimed is:—

The combination with a hay rack including a body, a front ladder, and a hound bar movably supported upon said body and equipped with brake shoes, of means for actuating said hound bar including an operating lever pivoted intermediate its ends on said ladder, a bell crank lever having a straight shank loosely held in upright position upon said body at a forward corner thereof, said shank terminating at its upper end in a leg extending along the front end of said body, and at its lower end terminating in a leg extending along the side of said body, a link connecting the uppermost leg of the bell crank lever with the lower end of said operating lever, means operatively connecting the lowermost leg of said bell crank lever with said hound bar, and means on said ladder for locking said lever in operative position.

In testimony whereof, I affix my signature, in presence of two witnesses.

GROVER C. BATTIN.

Witnesses:
H. E. METZGER,
J. L. BEEBE.

Copies of this patent may be obtained for five cents each, by addressing the "Commissioner of Patents, Washington, D. C."